US 6,715,572 B2

(12) United States Patent
Shimabukuro et al.

(10) Patent No.: US 6,715,572 B2
(45) Date of Patent: Apr. 6, 2004

(54) CONTROL SYSTEM FOR HYBRID VEHICLE

(75) Inventors: Eijiro Shimabukuro, Wako (JP);
Naohisa Morishita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/128,312

(22) Filed: Apr. 24, 2002

(65) Prior Publication Data
US 2002/0179351 A1 Dec. 5, 2002

(30) Foreign Application Priority Data

Jun. 1, 2001 (JP) .......................... 2001-166123
Mar. 5, 2002 (JP) .......................... 2002-058187

(51) Int. Cl.[7] ................................. B60K 6/02
(52) U.S. Cl. .................. 180/65.6; 180/65.2; 701/22
(58) Field of Search ............... 180/65.2, 65.6, 180/65.7; 701/22

(56) References Cited

U.S. PATENT DOCUMENTS

| 5,562,565 | A | * | 10/1996 | Moroto et al. ............... 477/3 |
| 5,789,823 | A | * | 8/1998 | Sherman ..................... 290/47 |
| 6,093,974 | A | * | 7/2000 | Tabata et al. ............. 290/40 R |
| 6,203,468 | B1 | * | 3/2001 | Nitta et al. .................. 477/5 |
| 6,278,915 | B1 | * | 8/2001 | Deguchi et al. ............. 701/22 |
| 6,315,068 | B1 | * | 11/2001 | Hoshiya et al. ........... 180/65.2 |
| 6,364,807 | B1 | * | 4/2002 | Koneda et al. ............... 477/5 |
| 6,453,222 | B1 | * | 9/2002 | Lasson et al. ............... 701/22 |
| 6,453,865 | B2 | * | 9/2002 | Hirose et al. ............. 123/179.4 |
| 6,524,217 | B1 | * | 2/2003 | Murakami et al. ............ 477/5 |

FOREIGN PATENT DOCUMENTS

| JP | 11-132321 | 5/1999 |
| JP | 2000-197209 | 7/2000 |
| JP | 2000-225871 | 8/2000 |

* cited by examiner

Primary Examiner—Brian L. Johnson
Assistant Examiner—Brian Swenson
(74) Attorney, Agent, or Firm—Westerman, Hattori, Daniels & Adrian, LLP

(57) ABSTRACT

A hybrid vehicle comprises a torque converter TC, which is connected to an engine E, a gear-type speed change mechanism, shift clutches 13c and 14c, a drive power transmission system, which transmits output rotation to drive wheels 6, and a second motor generator 2, which can drive the drive wheels 6. A control system for this hybrid vehicle comprises a throttle controller TH and a shift control valve CV. When the drive mode is switched from motor-driven mode to engine-driven mode, the control system sets a target speed ratio and calculates a vehicle-speed corresponding rotational speed that would arise at the output shaft of the engine if the current rotation of the drive wheels were transmitted with this target speed ratio and through the torque converter with a speed ratio of 1.0. Then, the control system controls the rotation of the engine to bring the output rotational speed of the engine closer to the vehicle-speed corresponding rotational speed. If the deviation of the output rotational speed of the engine from the vehicle-speed corresponding rotational speed becomes and remains equal to or smaller than a predetermined value for a predetermined time period, then the control system engages the frictionally engaging means to establish the target speed ratio.

7 Claims, 4 Drawing Sheets

CONTROL SYSTEM FOR HYBRID VEHICLE

FIELD OF THE INVENTION

The present invention relates to a hybrid vehicle whose drive wheels are driven either by an engine or by an electrical motor, both of which are provided in parallel with each other. In this hybrid vehicle, when a certain condition is satisfied during a travel, the engine, whose power is transmitted through a torque converter and a speed change mechanism to the drive wheels, stops, and instead, the electrical motor drives the drive wheels.

BACKGROUND OF THE INVENTION

Hybrid vehicles, which use an engine and an electrical motor, have been developed for fuel efficiency and cleanness of exhaust gas. For example, Japanese Laid-Open Patent Publication No. H11(1999)-132321 discloses a hybrid vehicle which comprises an engine, a first motor generator, a belt-type continuously variable transmission and a second motor generator. In this hybrid vehicle, the first motor generator is connected to the crank shaft of the engine, and the belt-type continuously variable transmission is connected through a torque converter to the output shaft of the engine. The second motor generator is connected to a power transmission system provided on the output side of the continuously variable transmission. In normal drive, the power of the engine is transmitted to the drive wheels with the rotational speed being changed by the continuously variable transmission. When the vehicle is halted, the engine is also halted. Thereafter, when the vehicle is started again, the drive wheels are driven by the second motor generator, and at the same time, the engine is started by the first motor generator. After the vehicle has been brought into motion, the mode of the drive is switched to drive the vehicle solely by the power of the engine.

Also, Japanese Laid-Open Patent Publication No. 2000-197209 discloses a hybrid vehicle. In this hybrid vehicle, the power of the engine is transmitted to the drive wheels through a torque converter and a gear-type speed change mechanism (i.e., a speed change mechanism with fixed ratios, used in a typical automatic transmission), which are connected to the output shaft of the engine. In parallel with this power transmission path, another path is provided for an electrical motor to drive the drive wheels. The vehicle comprises a controller for switching the drive mode to drive the wheels solely by the engine or to drive them by the engine and the electrical motor in correspondence to the torque ratio of the torque converter. By using the electrical motor in assistance of the engine, the vehicle has a high performance in acceleration especially for road condition that requires continuous acceleration. On the other hand, if the road condition does not require such large acceleration, then the assistance provided by the electrical motor is minimized to increase fuel efficiency.

By the way, the hybrid vehicle requires the switching of the drive mode, so this switching operation must be executed smoothly without a shift shock, which may otherwise happen when the hybrid vehicle is switched from the drive mode powered by the electrical motor (hereinafter referred to as "motor-driven mode") to the drive mode powered by the engine (hereinafter referred to as "engine-driven mode"), resulting in an abrupt rotational change and transmission torque change. Especially in a power-transmission mechanism that transmits the rotation of the engine through a torque converter and a gear-type speed change mechanism, it is important to avoid an abrupt rotational change and transmission torque change during the switching operation because the engine-driven mode is set up by actuation of frictionally engaging means (for example, clutches and brakes) in the gear-type speed change mechanism. Therefore, Japanese Laid-Open Patent Publication No. 2000-225871 discloses a drive-mode switching method, in which, at first, the rotational speeds at the input side and the output side of the speed change mechanism are brought into a mutually agreeing rotational speed, and then, by engaging a clutch, the drive mode is switched from the motor-driven mode to the engine-driven mode, in which the power of the drive mode is supplied through the speed change mechanism.

However, even though the input and output sides of the speed change mechanism are brought to an identical rotational speed, there is a possibility that the input rotational speed of the transmission differs from the output rotational speed of the engine because the torque converter exists between the output side of the engine and the input side of the speed change mechanism (i.e., the input and output of the torque converter are different in rotational speed). If the clutch is brought into engagement in this condition, it is difficult to execute the switching of the drive mode smoothly. In other words, if there is a difference between the rotational speeds of the input and output of the torque converter, then the torque transmission through the torque converter is carried out correspondingly to this rotational difference. If the drive mode is switched from the motor-driven mode to the engine-driven mode in this condition, then the switching may not be smooth because an abrupt torque change can occur and result in a shock.

SUMMARY OF THE INVENTION

It is an object of the present invention to provide a control system for a hybrid vehicle, which system is capable of switching smoothly the drive mode of the vehicle especially from motor-driven mode to engine-driven mode.

According to the present invention, a hybrid vehicle comprises an engine, a torque converter, a speed change mechanism (for example, the gear-type speed change mechanism, which comprises the transmission 10 described in the following embodiment), frictionally engaging means (for example, the shift clutches 13c and 14c in the following embodiment), wheels (for example, the wheels 6 in the following embodiment) and an electrically driven motor (for example, the second motor generator 2 in the following embodiment). In the construction of the hybrid vehicle, the engine allows to be stopped temporarily on a predetermined drive condition. The torque converter is connected to the output shaft of the engine, and the speed change mechanism is connected to the output shaft of the torque converter to change the output rotation of the torque converter. The frictionally engaging means is placed in the speed change mechanism to set a speed ratio, and the wheels are driven by the output rotation of the speed change mechanism. Additionally, the electrically driven motor can drive these wheels or other wheels. For this hybrid vehicle, the control system comprises engine-rotation control means (for example, the throttle controller TH in the following embodiment) and engagement control means (for example, the shift control valve CV in the following embodiment). The engine-rotation control means controls the rotation of the engine, and the engagement control means controls the engagement of the frictionally engaging means in correspondence to the control executed by the engine-rotation control means. When the drive mode of the hybrid vehicle is switched from motor-driven mode to engine-driven mode, the engine-rotation control means determines a target speed ratio for the speed change mechanism and calculates the vehicle-speed corresponding rotational speed (for example, the target TC input rotational speed NTCIN(O) in the following embodiment) that would arise at the output shaft of the engine if the current rotation of the drive wheels were transmitted through the speed change mechanism set at the target speed ratio and through the torque converter with a speed ratio of 1.0. Then, the engine-rotation control means controls the rotation of the engine to bring the output rotational speed of the engine closer to the vehicle-speed corresponding rotational speed. While the rotation of the engine is being controlled in this way by the engine-rotation control means, if the deviation of the output rotational speed of the engine from the vehicle-speed corresponding rotational speed becomes and remains equal to or smaller than a predetermined value (for example, 50 rpm as in the following embodiment) for a predetermined time period (for example, 0.2 seconds as in the following embodiment), then the engagement control means engages the frictionally engaging means to set the target speed ratio.

In this control system, when the drive mode is switched from the motor-driven mode to the engine-driven mode, the engine-rotation control means controls the rotation of the engine (and the input rotation of the torque converter, which is connected to the engine) to come closer to the vehicle-speed corresponding rotational speed. In this instance, little load is acting on the output side of the torque converter (i.e., little force is acting to rotate the input shaft of the speed change mechanism) because the frictionally engaging means has been disengaged for the motor-driven mode. In this condition, while the input rotation of the torque converter, which is connected to the output shaft of the engine, changes in response to the change of the engine rotation, the output rotational speed of the torque converter also changes following this input rotational change. Therefore, the output rotational speed of the torque converter also comes closer to the vehicle-speed corresponding rotational speed. While this rotational control is in progress, if the deviation of the output rotational speed of the engine from the vehicle-speed corresponding rotational speed becomes and remains equal to or smaller than a predetermined value for a predetermined time period, then the frictionally engaging means is engaged by the engagement control means to set the target speed ratio. In this way, the frictionally engaging means is brought into engagement with almost no torque transmission while the speed ratio of the torque converter is almost 1.0. As a result, the drive mode is switched smoothly to the engine-driven mode. Also, because the output rotational speed of the torque converter is controlled to come closer to the vehicle-speed corresponding rotational speed, the rotational difference across the frictionally engaging means is relatively small when the frictionally engaging means is brought into engagement. As a result, the engagement of the frictionally engaging means is executed smoothly.

It is preferable that an auxiliary electrically driven motor (for example, the first motor generator 1 in the following embodiment) be provided in connection to the engine, so that it will assist the rotation of the engine. In this case, the engine-rotation control means controls the auxiliary electrically driven motor to assist the rotation of the engine in such a way that, when the drive mode is switched from the motor-driven mode to the engine-driven mode, the output rotational speed of the engine will come closer to the vehicle-speed corresponding rotational speed. It is difficult to control the rotation of the engine if this control is done solely by the throttle opening control. On the other hand, the rotational control of the auxiliary electrically driven motor is executable accurately because it is executed by electrical power supply control. Therefore, by using the auxiliary electrically driven motor, the rotation of the engine is controlled accurately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
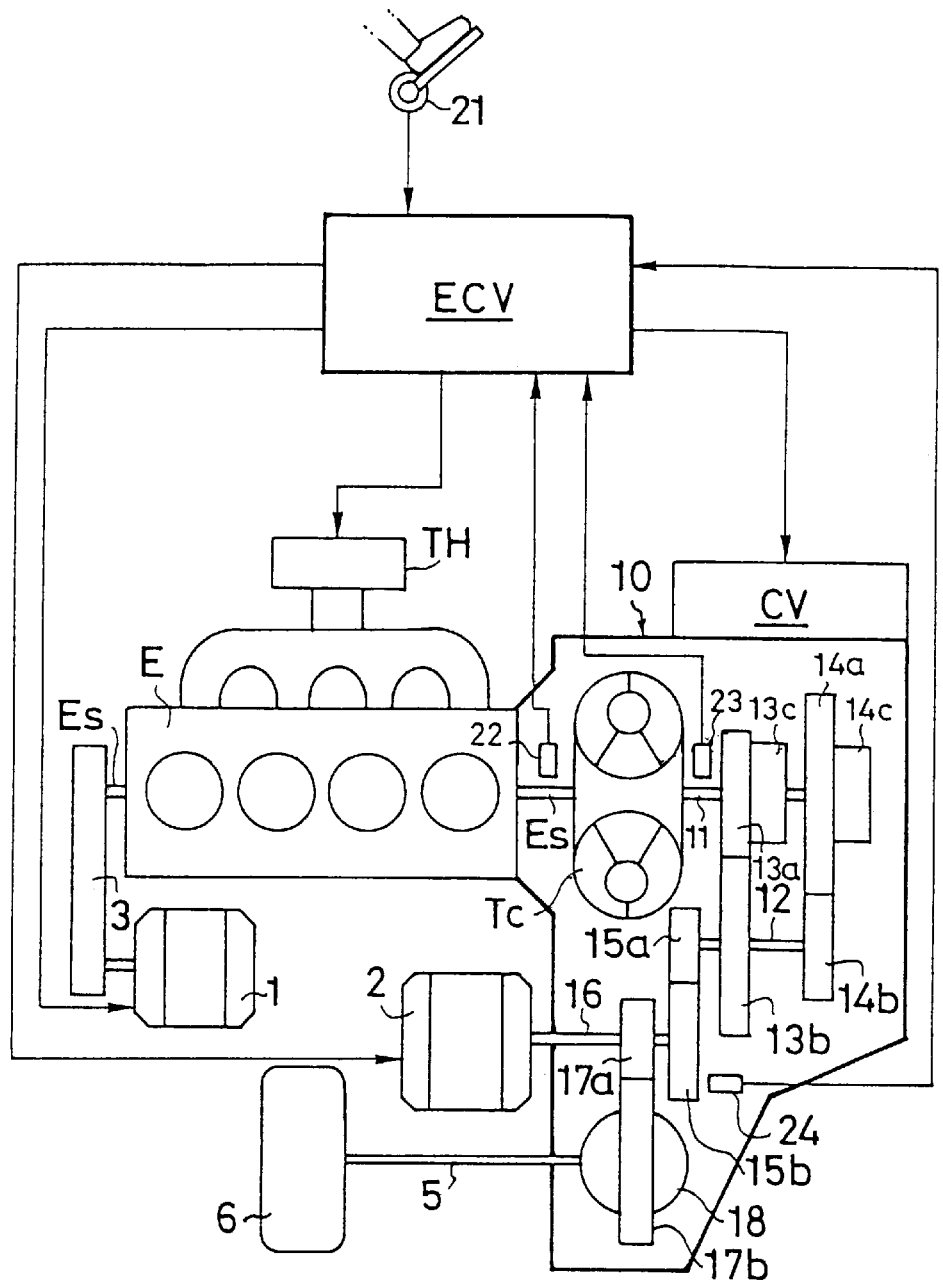
FIG. 1 is a schematic diagram describing the construction of a power transmission used for a hybrid vehicle and the construction of a control system according to the present invention.

A preferred embodiment according to the present invention is described in reference to the drawings. FIG. 1 shows the construction of a power transmission and a control system according to the present invention, which are used in a hybrid vehicle. The power transmission comprises an engine E, a first motor generator 1 and a second motor generator 2 as drive power sources. The output shaft of the first motor generator 1 is connected with the output shaft Es of the engine E through a belt transmission mechanism 3. The first motor generator 1 is to assist the drive power of the engine or to generate electricity when it is driven and rotated by the engine E.

On the other side of the engine E, a transmission 10 is provided to receive the rotation of the output shaft Es of the engine E. The transmission 10 comprises a torque converter TC and a gear-type speed change mechanism. The torque converter TC is connected to the output shaft Es of the engine E on one side and to the gear-type speed change mechanism on the other side. The gear-type speed change mechanism comprises an input shaft 11 of the transmission, and a countershaft 12 and an output shaft 16 of the transmission. The input shaft 11 is connected to the output side of the torque converter TC, and the countershaft 12 is disposed in parallel with the input shaft 11. The transmission comprises a plurality of gear trains between the input shaft 11 and the countershaft 12.

In general, a vehicular transmission comprises a plurality of gear trains in the number which corresponds to that of the speed ratios of the transmission. To simplify the description, here, only two gear trains, namely, a first gear train 13a and 13b and a second gear train 14a and 14b are shown in the drawing. In these gear trains, drive gears 13a and 14a are mounted rotatably on the input shaft 11 of the transmission, with shift clutches 13c and 14c to engage and disengage these drive gears to and from the input shaft 11, while driven gears 13b and 14b, which mesh with the drive gears 13a and 14a, respectively, are fixed on the countershaft 12. In this arrangement, by selectively engaging the shift clutches 13c and 14c, the power is transmitted selectively through either the first gear train 13a and 13b or the second gear train 14a and 14b. When both the shift clutches are disengaged, the transmission is set into neutral condition. In this condition, there is no transmission of power between the input shaft 11 and the countershaft 12 of the transmission.

To control the engagement of the shift clutches 13c and 14c, the control system is equipped with a shift control valve CV, which controls the supply of the pressure from the shift control valve CV to the shift clutches 13c and 14c for the engagement actuation of these shift clutches. The operation of the shift control valve CV itself is controlled by a built-in solenoid valve, whose operation is controlled by an electronic control unit ECU with a control signal controlling the supply of the pressure used for the engagement actuation of the shift clutches 13c and 14c.

An output drive gear 15a is fixed on the countershaft 12, and the output driven gear 15b, which meshes with the output drive gear 15a, is fixed on the output shaft 16 of the transmission. This output shaft 16 is connected to the drive shaft of the second motor generator 2, so that the output shaft 16 is driven and rotated by the second motor generator 2. Furthermore, a final drive gear 17a is fixed on the output shaft 16 of the transmission, and a final driven gear 17b, which meshes with the final drive gear 17a, is provided integratedly on a differential mechanism 18 in a one-piece body. The differential mechanism 18 is connected to an outwardly extending axle shaft 5 that carries drive wheels 6.

The power transmission constructed as described above further comprises a throttle controller TH, which controls the throttle opening $\theta$TH of the engine E. The electronic control unit ECU controls the operation of the throttle controller TH as well as the operation of the first and second motor generators 1 and 2. In addition, the electronic control unit ECU receives a detection signal from an accelerator opening sensor 21, which detects the degree of the accelerator pedal being pressed down, i.e., the accelerator opening $\theta$AP, another detection signal from an engine rotation sensor 22, which detects the rotation Ne of the output shaft Es of the engine, i.e., the input rotational speed of the torque converter TC, another detection signal from a transmission input rotation sensor 23, which detects the output rotation of the torque converter TC, i.e., the rotation of the input shaft 11 of the transmission, and another detection signal from a transmission output rotation sensor 24, which detects the rotation of the output shaft 16 of the transmission.

The hybrid vehicle, which incorporates this power transmission, is set into the engine-driven mode when the drive power of the engine E is transmitted through the transmission 10 to the drive wheels. Also, the hybrid vehicle is set into the motor-driven mode when the engine E is stopped, the transmission 10 is set into neutral condition, and the drive power of the second motor generator 2 is transmitted to the drive wheels. Now, the control for switching the drive mode from the motor-driven mode to the engine-driven mode is described in reference to FIGS. 2 and 3.

The drive mode of the hybrid vehicle is set into the motor-driven mode when the drive power required for the motion of the vehicle as well as the accelerator opening $\theta$AP is relatively small. While the vehicle is in the motor-driven mode, if the accelerator pedal is pressed, the accelerator opening $\theta$AP increases and becomes equal to or greater than a predetermined opening $\theta$AP(1) (time t1 in FIG. 2). At this point, the control system judges the condition as the vehicle requires a shift from the motor-driven mode (EV mode) to the engine-driven mode (ENG mode) at Step S2, and it sets the vehicle in a transition mode, where the vehicle is still maintained in the EV mode at Step S3. If the control system judges the vehicle is in this transition mode at Step S1, then it determines whether the engine E is running or not at Step S4. In this case, as the engine is not running, the control system proceeds to Step S5 and starts the engine E.

After the engine has started into operation, the control system always controls to increase the input rotational speed of the torque converter TC to a target value at Step S13, notwithstanding any of the following conditional determinations. This target TC input rotational speed is calculated as follows. The control system determines a target gear ratio So from the accelerator opening $\theta$AP and the speed of the vehicle at Step S6 and determines whether the clutch to set the target gear ratio is disengaged or not at Step S7. In this case, this particular clutch is disengaged, so the control flow proceeds to Step S8.

At Step S8, the control system calculates the output rotational speed of the torque converter TC, i.e., the rotational speed of the input shaft 11 of the transmission, as an imaginary TC output rotational speed NTCOUT(O) as if the speed ratio of the transmission 10 were set to the target gear ratio So at the current vehicle speed. The imaginary TC output rotational speed NTCOUT(O) is calculated by multiplying the rotational speed NAS of the axle shaft 5 with the target gear ratio So. Then, the control system proceeds to Step S9 and calculates the target TC input rotational speed NTCIN(O) for a condition that the speed ratio SR of the torque converter TC is 1.0. The target TC input rotational speed NTCIN(O) is the rotational speed that corresponds to the current vehicle speed with the input rotational speed of the torque converter TC being equal to the output rotational speed of the engine (therefore, the target TC input rotational speed NTCIN(O) is also referred to as the vehicle-speed corresponding rotational speed). The target TC input rotational speed NTCIN(O) equals the imaginary TC output rotational speed NTCOUT(O) because the speed ratio SR of the torque converter TC is 1.0.

The control system, after determining the target TC input rotational speed NTCIN(O) in this way, controls the throttle opening $\theta$TH of the engine E by the throttle controller TH at Step S13, to bring the output rotational speed of the engine E closer to the target TC input rotational speed NTCIN(O). In this instance, the operation of the first motor generator 1 may be also controlled simultaneously while the operation of the engine E is controlled to bring the output rotational speed of the engine closer to the target TC input rotational speed NTCIN(O). The effect of this control action is described in FIG. 2, which shows changes observed in specific characteristic values, in the section following time t1, at which the motor-driven mode is switched to the engine-driven mode.

At this time, the clutch of the transmission 10 is not yet engaged, so the transmission 10 is in neutral. In this condition, the output of the engine E is not transmitted to the drive wheels, but the second motor generator 2 is controlled to provide the driving torque that corresponds to the accelerator opening θAP for driving the vehicle. In other words, during the mode transition, the drive wheels are still driven by the second motor generator 2 although the engine is already running. Therefore, this transition mode may be still referred to as EV mode, i.e., the motor-driven mode.

Figure 2:
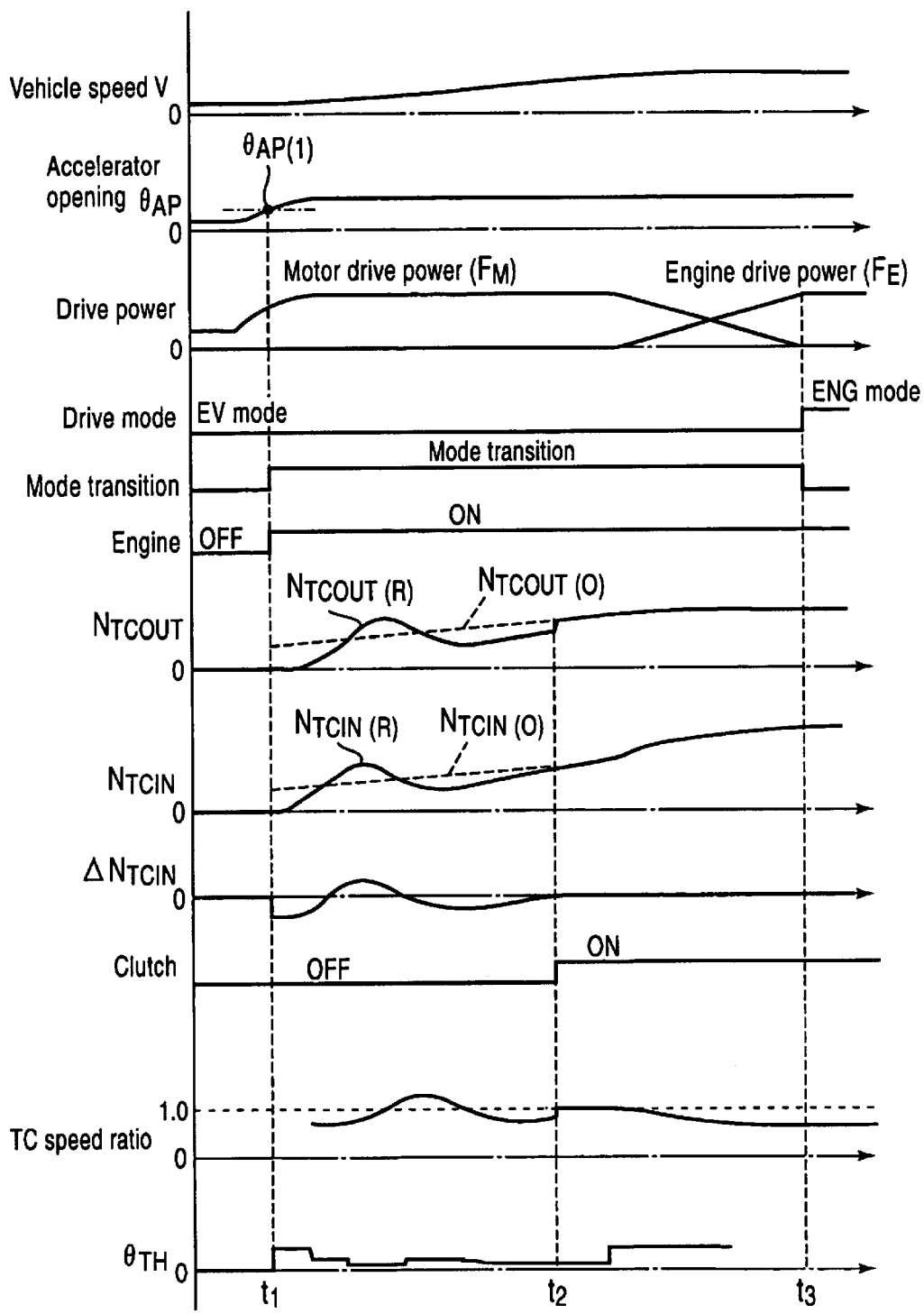
FIG. 2 is a graph showing changes that are observed in specific properties when the control system executes a shift from motor-driven mode to engine-driven mode.

While the output rotational speed of the engine E is being brought to the target TC input rotational speed NTCIN(O) by the above described throttle control, etc., the torque converter input rotational deviation ΔNTCIN (=the actual TC input rotational speed NTCIN(R)−the target TC input rotational speed NTCIN(O)) fluctuates and comes to zero as shown in FIG. 2. Also, the output rotational speed of the torque converter fluctuates, and the difference between the actual TC output rotational speed NTCOUT(R) and the imaginary TC output rotational speed NTCOUT(O) settles to a relatively small value as shown in FIG. 2. At the same time, the speed ratio SR of the torque converter TC changes correspondingly to the changes of the actual TC input rotational speed NTCIN(R) and the actual TC output rotational speed NTCOUT(R) and settles to a value little smaller than 1.0 as shown in FIG. 2. Also, the target TC input rotational speed NTCIN(O) and the target TC output rotational speed NTCOUT(O) change in correspondence to the vehicle speed V as shown in broken lines in FIG. 2.

Figure 3:
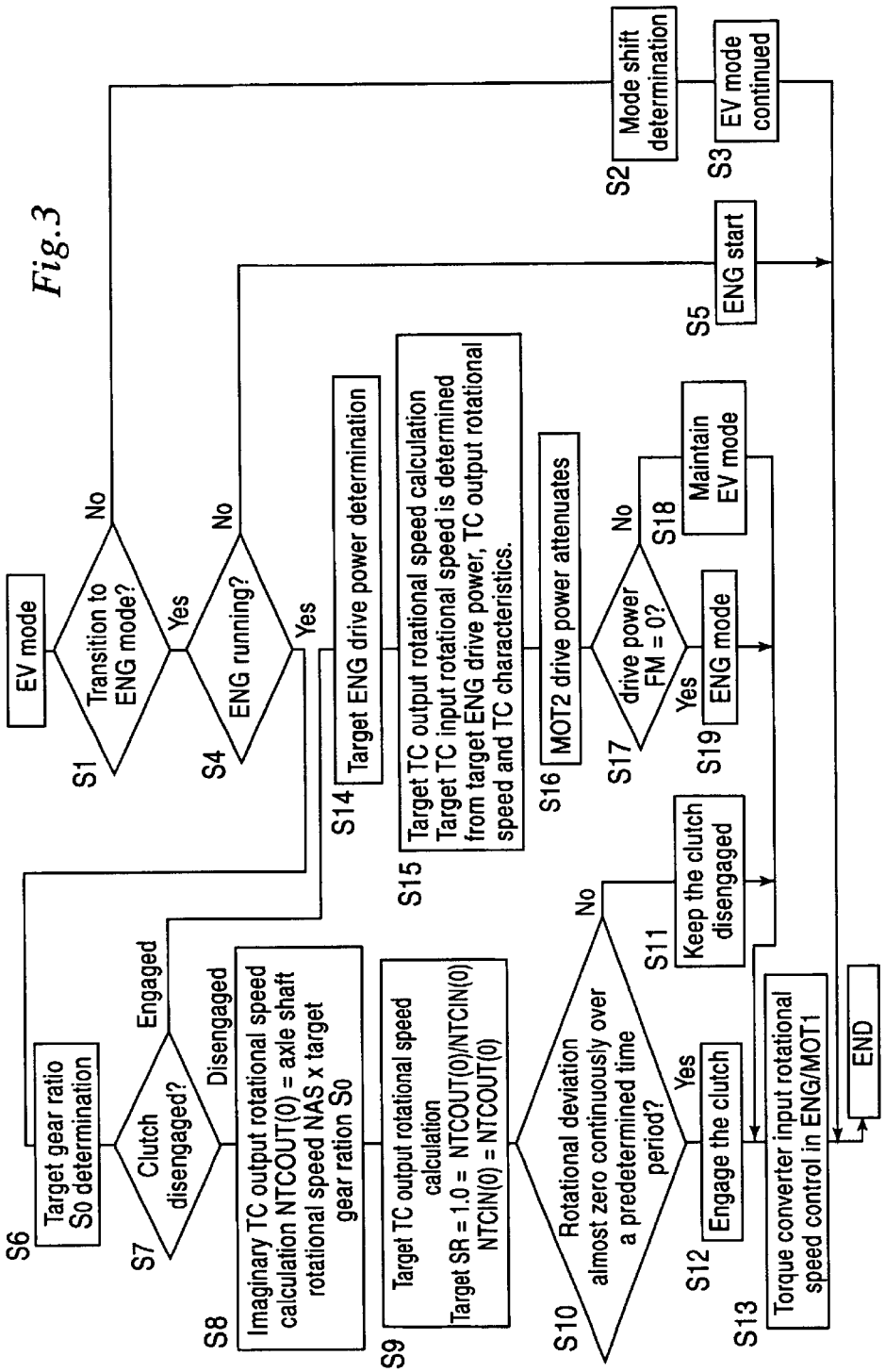
FIG. 3 is a flowchart showing the steps executed by the control system for the shift from the motor-driven mode to the engine-driven mode.

When the input rotational deviation ΔNTCIN, which equals the deviation of the actual output rotational speed of the engine from the vehicle-speed corresponding rotational speed, becomes smaller and stays smaller than a predetermined value for a predetermined time period at time t2 in FIG. 2, i.e., at Step S10 in FIG. 3, the control system engages the clutch that sets the above mentioned target gear ratio at Step S12. Here, preferably, this predetermined value for the rotational deviation is about 50 rpm, and the predetermined time period is about 0.2 seconds. As shown in FIG. 2, the rotational deviation becomes equal to or smaller than 50 rpm prior to time t2, and the control system determines whether or not the rotational deviation stays smaller than this value continuously. If it is so, then the control system engages the above mentioned clutch. This determination whether the rotational deviation is continuously equal to or smaller than a predetermined value, i.e., 50 rpm in this case, is executed by measuring the time period during which the rotational deviation is equal to or smaller than 50 rpm and by judging if this measured time period is equal to or greater than a predetermined value, i.e., 0.2 seconds in this case.

At time t2, the engagement of the clutch is executed smoothly without any shock because the speed ratio SR of the torque converter TC is almost 1.0, and the input and output rotational speed difference of the clutch is very small. After the engagement of the clutch, the control system determines a target engine drive power to generate a drive power smoothly from the engine at Step S14 and determines a target TC input rotational speed in consideration of this target engine drive power, the output rotational speed of the torque converter and the properties of the torque converter at Step S15. Then, the control system controls the throttle of the engine E and the operation of the motor generator 1 (mainly the throttle of the engine E) to bring the engine output rotational speed to the target TC input rotational speed. In this way, the drive power of the engine is increased gradually while the drive power of the second motor generator 2 is decreased gradually as shown in FIG. 2, at Step S16. As a result, the drive mode of the vehicle is shifted smoothly from the motor-driven mode to the engine-driven mode. When the drive power of the second motor generator 2 becomes zero at Step S17, the engine is fully running in ENG mode at time t3 in FIG. 2 and at Step S19 in FIG. 3.

Figure 4:
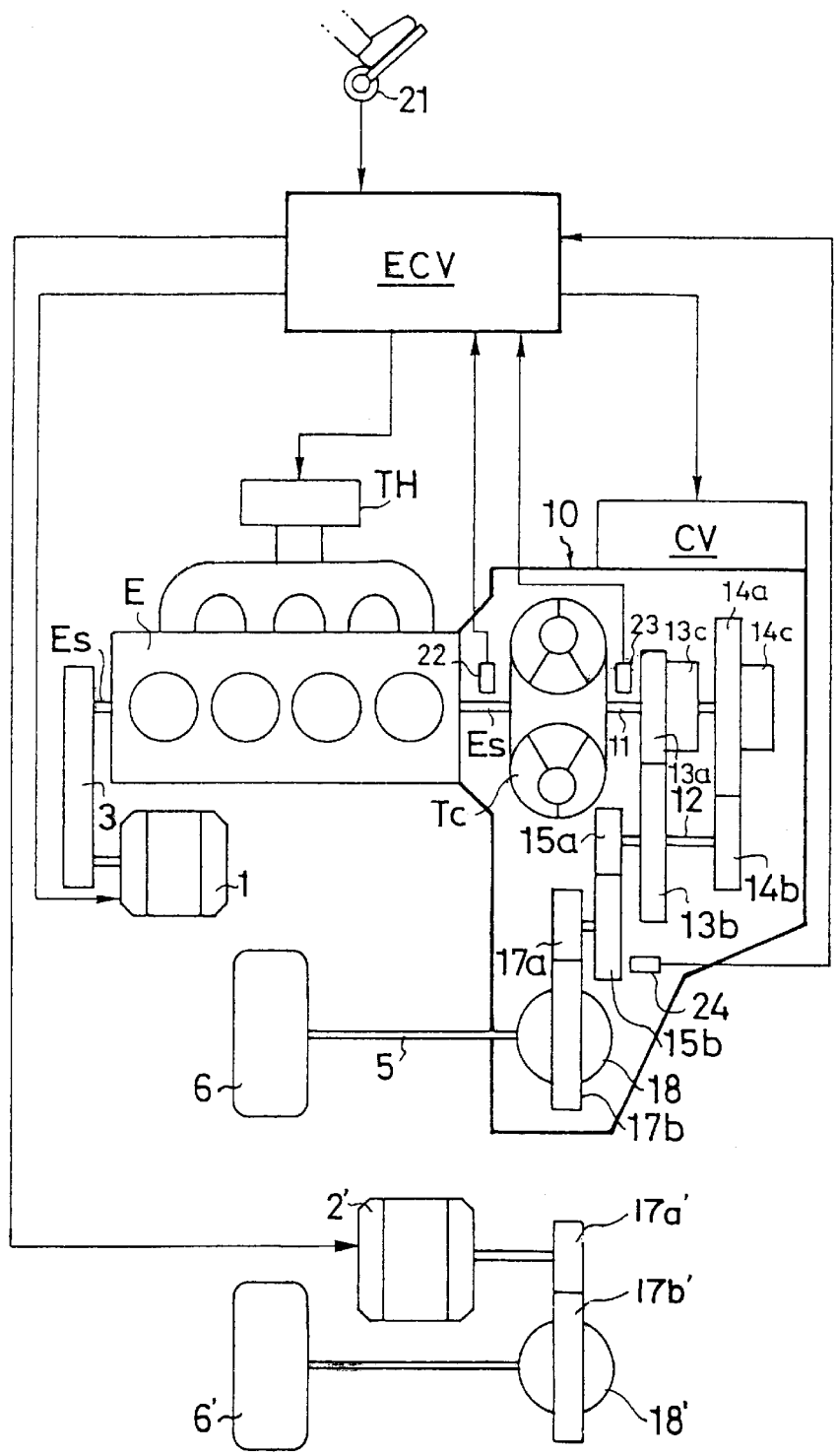
FIG. 4 is a schematic diagram describing the construction of another power transmission used for a hybrid vehicle and the construction of another control system according to the present invention.

FIG. 4 shows the construction of a power transmission and a control system as a second embodiment according to the present invention, which are used in a hybrid vehicle. In this case, the second motor generator 2' is not connected to an axle shaft (front axle) that is driven by the output rotation of the transmission but is connected to a second final drive gear 17a', which meshes with a second final driven gear 17b' provided integratedly with a second differential mechanism 18' on an axle shaft (rear axle). Except this part of the construction, these power transmission and control system are the same as the first embodiment, so this second embodiment is not described in detail.

A hybrid vehicle, which incorporates this power transmission, is set into engine-driven mode, so that the drive power of the engine E is transmitted through the transmission 10 to drive wheels (front wheels). Also, the hybrid vehicle is set into motor-driven mode when the engine E is stopped, the transmission 10 is set into neutral condition, and the drive power of the second motor generator 2' is transmitted to other drive wheels (rear wheels). The control for switching the drive mode can be performed in the same way as that described for the first embodiment. Therefore, when the drive mode is shifted from the motor-driven mode to the engine-driven mode by the control system according to the present invention, the switching of the drive mode is executed smoothly in the same way as the first embodiment.

As described above, when the drive mode is switched from motor-driven mode to engine-driven mode, engine-rotation control means brings the rotation of the engine (i.e., the input rotation of the torque converter) closer to the vehicle-speed corresponding rotational speed calculated suppositionally with a speed ratio of 1.0. In this instance, while the input rotation of the torque converter, which is connected to the output shaft of the engine, changes in response to the change of the engine rotation, the output rotational speed of the torque converter also changes. While this rotational control is in progress, if the difference between the output rotational speed of the engine and the vehicle-speed corresponding rotational speed becomes and remains equal to or smaller than a predetermined value for a predetermined time period, then frictionally engaging means is engaged by engagement control means to set a target speed ratio. In this way, the frictionally engaging means is engaged with almost no torque transmission while the speed ratio of the torque converter is almost 1.0. As a result, the drive mode is switched smoothly from the motor-driven mode to the engine-driven mode. Also, as the output rotational speed of the torque converter is controlled to come closer to the vehicle-speed corresponding rotational speed, the rotational difference is relatively small when the frictionally engaging means is engaged. As a result, the engagement is executed smoothly.

It is preferable that an auxiliary electrically driven motor be provided in connection to the engine, so that it will assist the rotation of the engine. In this case, the engine-rotation control means controls the auxiliary electrically driven motor to assist the rotation of the engine, so that when the drive mode is switched from the motor-driven mode to the engine-driven mode, the output rotational speed of the engine will come closer to the vehicle-speed corresponding rotational speed. It is difficult to control the rotation of the engine if the control is done solely by the throttle opening control. On the other hand, the rotational control of the auxiliary electrically driven motor is executable accurately as it is done by electrical power supply control. Therefore, by using the auxiliary electrically driven motor, the rotation of the engine is controlled accurately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Related Applications

This application claims the priority of Japanese Patent Application No.2001-166123 filed on Jun. 1, 2001 and Japanese Patent Application No.2002-58187 filed on Mar. 5, 2002, which are incorporated herein by reference.

What is claimed is:

1. A control system for a hybrid vehicle comprising an engine, which can be stopped temporarily on a predetermined drive condition, a torque converter, which is connected to an output shaft of said engine, a speed change mechanism, which is connected to an output shaft of said torque converter to change output rotation of said torque converter, frictional engaging means, which is placed in said speed change mechanism to set a speed ratio, wheels, which are driven by output rotation of said speed change mechanism, and an electrically driven motor, which can drive said wheels or other wheels;

said control system comprising engine-rotation control means, which controls rotation of said engine, and engagement control means, which controls engagement of said frictional engaging means in correspondence to control executed by said engine-rotation control means; wherein:

when drive mode is switched from motor-driven mode, in which said wheels or said other wheels are driven by said electrically driven motor, to engine-driven mode, in which said wheels are driven by said engine, said engine-rotation control means sets a target speed ratio for said speed change mechanism, calculates a vehicle-speed corresponding rotational speed that would arise at the output shaft of said engine if current rotation of said wheels were transmitted through said speed change mechanism set at said target speed ratio and through said torque converter with a speed ratio of substantially 1.0, and controls the rotation of said engine to bring the output rotational speed of said engine closer to said vehicle-speed corresponding rotational speed; and while the rotation of said engine is being controlled by said engine-rotation control means, if deviation of the output rotational speed of said engine from said vehicle-speed corresponding rotational speed becomes and remains equal to or smaller than a predetermined value for a predetermined time period, then said engagement control means engages said frictional engaging means to establish said target speed ratio.

2. The control system as set forth in claim 1, wherein:

said electrically driven motor is connected to the output shaft of said speed change mechanism; and said electrically driven motor can drive the output shaft of said speed change mechanism to drive said wheels.

3. The control system as set forth in claim 1, wherein:

one pair of front wheels or of rear wheels are driven by said engine; and other pair are driven by said electrical motor.

4. The control system as set forth in claim 1, wherein:

said speed change mechanism comprises an input shaft, which is connected to an output side of said torque converter, a countershaft, which is disposed in parallel with said input shaft, and an output shaft;

said speed change mechanism further comprises a plurality of gear trains, which are disposed in parallel with one another, between said input shaft and said countershaft; and any of said gear trains is selected by said frictional engaging means to establish said speed ratio.

5. The control system as set forth in claim 1, wherein:

said engine-rotation control means comprises a throttle controller, which controls throttle opening of said engine, and an electronic controller, which controls actuation of said throttle controller.

6. The control system as set forth in claim 1, further comprising an auxiliary electrically driven motor, which is connected to the output shaft of said engine, to assist the rotation thereof; and when the drive mode is switched from said motor-driven mode to said engine-driven mode, said engine-rotation control means controls said auxiliary electrically driven motor to assist the rotation of said engine so that the output rotational speed of said engine will come closer to said vehicle-speed corresponding rotational speed.

7. The control system as set forth in claim 6, wherein:

said auxiliary electrically driven motor is connected to the output shaft of said engine; and said auxiliary electrically driven motor can assist and control the rotation of the output shaft of said engine.

* * * * *